United States Patent [19]

Ling et al.

[11] Patent Number: 5,741,981
[45] Date of Patent: Apr. 21, 1998

[54] DEVICE AND METHOD OF MEASURING THE DRAW-IN FORCE FOR STATIONARY AND ROTATING SPINDLE

[75] Inventors: Cheng-Chang Ling, Chung-Cheng; Yong-Dar Chen, Chiayi; Wen-Hsin Hsieh, Taipei; Chun-Hung Huang, Chutung County, all of Taiwan

[73] Assignee: Industrial Technology Research Institute, Hsinchen, Taiwan

[21] Appl. No.: 755,428

[22] Filed: Nov. 22, 1996

[51] Int. Cl.⁶ ........................................... G01L 5/12
[52] U.S. Cl. .............................. 73/862.49; 73/862.541; 73/862.392
[58] Field of Search ................ 73/862.06, 862.07, 73/862.381, 862.392, 862.49, 862.51, 862.541, 862.041, 824, 826

[56] References Cited

U.S. PATENT DOCUMENTS

| 4,133,206 | 1/1979 | Hida et al. ........................ 73/862.584 |
| 4,856,349 | 8/1989 | Huser ................................ 73/862.54 |
| 5,342,155 | 8/1994 | Harroun ............................ 409/131 |

Primary Examiner—Richard Chilcot
Assistant Examiner—Max H. Noori
Attorney, Agent, or Firm—W. Wayne Liauh

[57] ABSTRACT

A measuring apparatus for measuring the draw-in force of a spindle of a machine tool includes a measuring mechanism and a displacement sensor for measuring displacement in a non-contact manner, without contacting the spindle. The draw-in force is converted into a displacement value. The apparatus may be used to measure the draw-in force of a rotating or a stationary spindle.

8 Claims, 8 Drawing Sheets

DEVICE AND METHOD OF MEASURING THE DRAW-IN FORCE FOR STATIONARY AND ROTATING SPINDLE

BACKGROUND OF THE INVENTION

1. Field of the Invention

The present invention relates generally to a measuring apparatus for measuring the draw-in force of the spindle of a machine tool, and more particularly to a measuring apparatus which measures the draw-in force of the spindle when it is stationary or moving.

2. Description of the Prior Art

Spindles are important components of machine tools such as milling machines. For instance, in machining centers and computerized numerical controlled systems (CNC), spindles are used to secure all kinds of cutting tools in which fast rotation enables the cutting tools to have sufficient surface speed to cut or machine the workpieces. The spindle utilizes the draw-in force afforded by the draw-in mechanism to achieve clamping of the cutting tools. Therefore, if the draw-in force of the draw-in mechanism is inadequate or unstable, apart from lowering the stiffness of the spindle during machining, it may result in low chip removal rates, shorter tool life and vibrations, thus affecting production efficiency and quality. It is well known to those skilled in the art that the design of the draw-in mechanism and the draw-in force are significant factors in determining the design of the spindle.

The size of the draw-in force involves the materials of the spindle and the tool holder, their cooperation and stiffness as well as the cutting conditions. Whether it is a steel ball or pawl type tool clamp mechanism, the machine designer will make adjustments and modifications taking into account the above-mentioned factors. Generally speaking, the size of the draw-in force may be estimated by using formulae or from experience. However, it is impossible to know whether or not the actual draw-in force obtained after the design is put into actual practice is as desired or whether or not the draw-in force and stiffness of the tool remain the same after prolonged use. Therefore, a measuring system for measuring the draw-in force of the spindle of the machine tool at any time is necessary.

Another latent problem which no one has as yet paid any special attention or probed into is that, with the demand for higher rotational speed of the spindle, the draw-in force of the spindle during rotation will inevitably change, reducing the draw-in force during the process of machining, hence affecting production quality. Therefore, the present invention is directed to measuring not only the size of the draw-in force of a stationary spindle but also the changes in the draw-in force of a rotating spindle.

According to research, draw-in force not only can change the static friction between the tool holder and the taper of the spindle, it can also achieve the following effects: 1. It can change the deflection angle of the tool holder when the latter is subjected to force; 2. it can change the bending stiffness at the interface between the tool holder and the spindle. It is taught in many documents or references that the increase of the magnitude of the draw-in force has the positive effect of stabilizing the cutting performance of the tool. However, the greater the draw-in force, the greater the tool release force required. In other words, there are negative effects. Various studies and research work are largely directed to the effects of changes of the draw-in force on the above-mentioned characteristics of the spindle so as to help designers to determine the optimum draw-in force. Few is directed to the study of the changes of the draw-in force during rotation of the draw-in mechanism.

For inventions directed to the measuring of tool draw-in force of a static spindle, reference may be made to U.S. Pat. No. 4,856,349 in which pressure generated at both sides of a load cell when a spindle therein displaces is measured and converted to display as the tool draw-in force.

Another prior art is the Delta Control force measuring system manufactured by Utilis Muellheim AG. The system is a modular one having a digital display for indicating the measured values and can be used on a wide variety of machine tools. A major disadvantage of this system is that it can only be used with a switched-off drive motor of the machine spindle. In other words, it cannot measure the draw-in force of a rotating spindle. Whether or not rotation of the spindle has any effects on the draw-in mechanism or even the size of the draw-in force is totally overlooked.

In the course of designing a force measuring system, a major difficulty encountered is that the draw-in mechanism itself is a rotating body, rotating at a speed as high as tens of thousands of rotations per minute. In order to achieve the object of measuring the machine spindle when the drive motor is switched on, it had been considered during conception of the present invention to employ a so-called slip ring to serve the purpose of connection during rotation of the machine and to use a brush to transmit a rotation signal to a fixed contact on the outside. Substantial efforts had been put in probing into the possibility of such an idea, which was afterwards abandoned in view of the complexity in construction and applications as well as the manufacturing and maintenance costs involved.

SUMMARY OF THE INVENTION

A primary object of the present invention is to provide a non-contact measuring method for measuring the draw-in force of a machine spindle.

Another object of the present invention is to provide a method for measuring the draw-in force of a stationary or rotating machine spindle.

A further object of the present invention is to provide a measuring apparatus which may convert the draw-in force of a machine spindle into a displacement value for measurement and processed by a displacement sensor.

Still another object of the present invention is to provide a measuring mechanism utilizing an elastic element to restrict displacement of a sliding shaft in the measuring mechanism.

In the present invention, the measured draw-in force of the spindle is converted into a displacement value according to a preset constant value of a particular elastic element of a measuring mechanism of the invention, the displacement value being measured by a displacement sensor. The measured displacement value is multiplied by the preset constant value. After correction, the actual draw-in force value of the draw-in mechanism inside the spindle may be obtained.

A sliding shaft of the measuring mechanism may, when subjected to the draw-in force, generate an axial displacement until the draw-in force balances the resistance generated by the elastic element inside the measuring mechanism. The displacement sensor is fixedly mounted near the sliding shaft of the measuring mechanism. It measures the displacement in a non-contact manner and converts the same into a draw-in force value. Therefore, whether the spindle is rotating or stationary, displacement measurement may be proceeded.

The measuring mechanism may also be provided with an adjusting element for adjusting the resistance of the elastic element by using a lower limit of the draw-in force value. The elastic element is affected by the centrifugal force generated during rotation, but it may be compensated by adjusting the set constant value to the measured displacement value.

BRIEF DESCRIPTION OF THE DRAWINGS

The foregoing and other features and advantages of the present invention will be more clearly understood from the following detailed description and the accompanying drawings, in which.

FIGS. 4A and 4B are respective sectional views of the preferred embodiment of FIG. 1 mounted on the spindle of a machine tool, in which FIG. 4B illustrates the state of the measuring mechanism after the draw-in mechanism in the spindle has exerted a force thereon;

DETAILED DESCRIPTION OF THE PREFERRED EMBODIMENTS

According to the present invention, the measuring method essentially comprises:

(a) coupling a support to an end of a spindle of a machine tool;

(b) mounting pivotally a sliding element having a projecting portion at a center of the support and causing a tool draw-in mechanism inside the spindle to clamp one end of the sliding element;

(c) selecting and disposing in advance an elastic element between the support and the projecting portion of the sliding element so as to generate a resistance when the sliding element is being pulled;

(d) predetermining a constant value (to be described hereinafter) according to the characteristics of the elastic element;

(e) adjusting the resistance of the elastic element to predetermine the minimum force required to pull the sliding element;

(f) securing a displacement sensor for sensing the displacement of the sliding element; and (g) multiplying the constant value of the selected elastic element by the sensed displacement value to obtain a draw-in force value, wherein the displacement sensing is achieved in a non-contact measurement mode in which a best mode is that the displacement sensor is aligned with the other end of the sliding element.

The sensor used in measuring is a non-contact type position sensor. There are many types of commercialized position sensing devices. A combination of the laser displacement measuring devices LC2320 and controller LC2100 manufactured by KEYENCE of Japan is a suitable choice.

During the process of measurement, if there exist error factors and if they are not found out and overcome, the measurement results will be incorrect. A most influential error factor is the elastic element. For the elastic element, helical springs, multiple overlapping Belleville springs, elastic rubber or plastic tubes, or other equivalents may be adapted.

Figure 5:
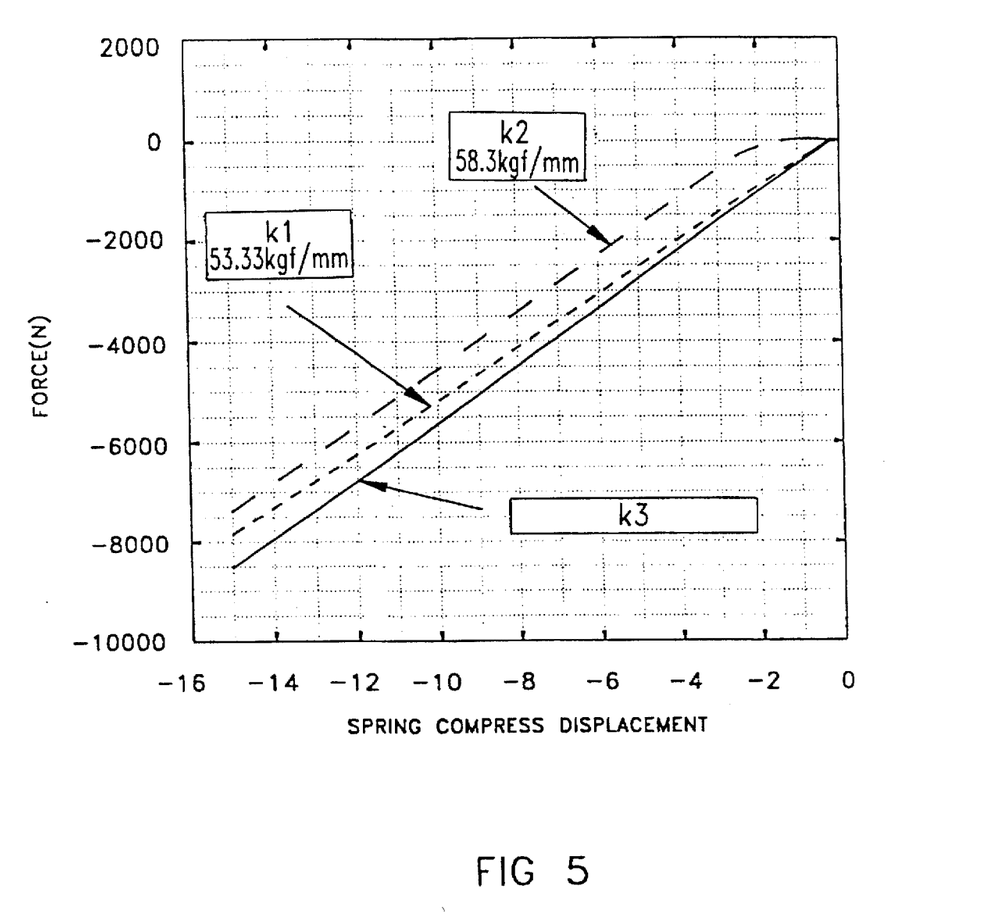
FIG. 5 is an error graph in which a helical pressure spring used in the present invention is in a static state.
Figure 6:
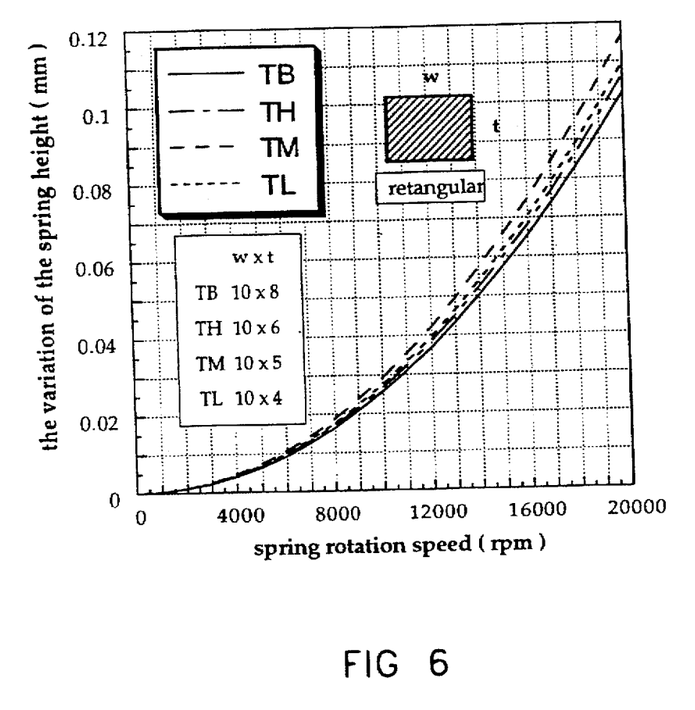
FIG. 6 is a graph showing axial displacements of various representative spring elements versus different rotational speeds.

The value of the elastic constant may vary according to the material and structure of the elastic element itself as well as the mode of machining, but it may also be obtained by referring to FIG. 5 or 6. At present, the most readily obtainable elastic element is the helical pressure spring, the deflection amount $\Delta Y$ of the axial displacement thereof during rotation may be obtained using the following equation:

$$\Delta Y = L \ (\text{Sin } po - \text{Sin } p1)$$

wherein L is the length of the helix, po the helical angle before rotation, and p1 the helical angle after rotation.

Figure 1:
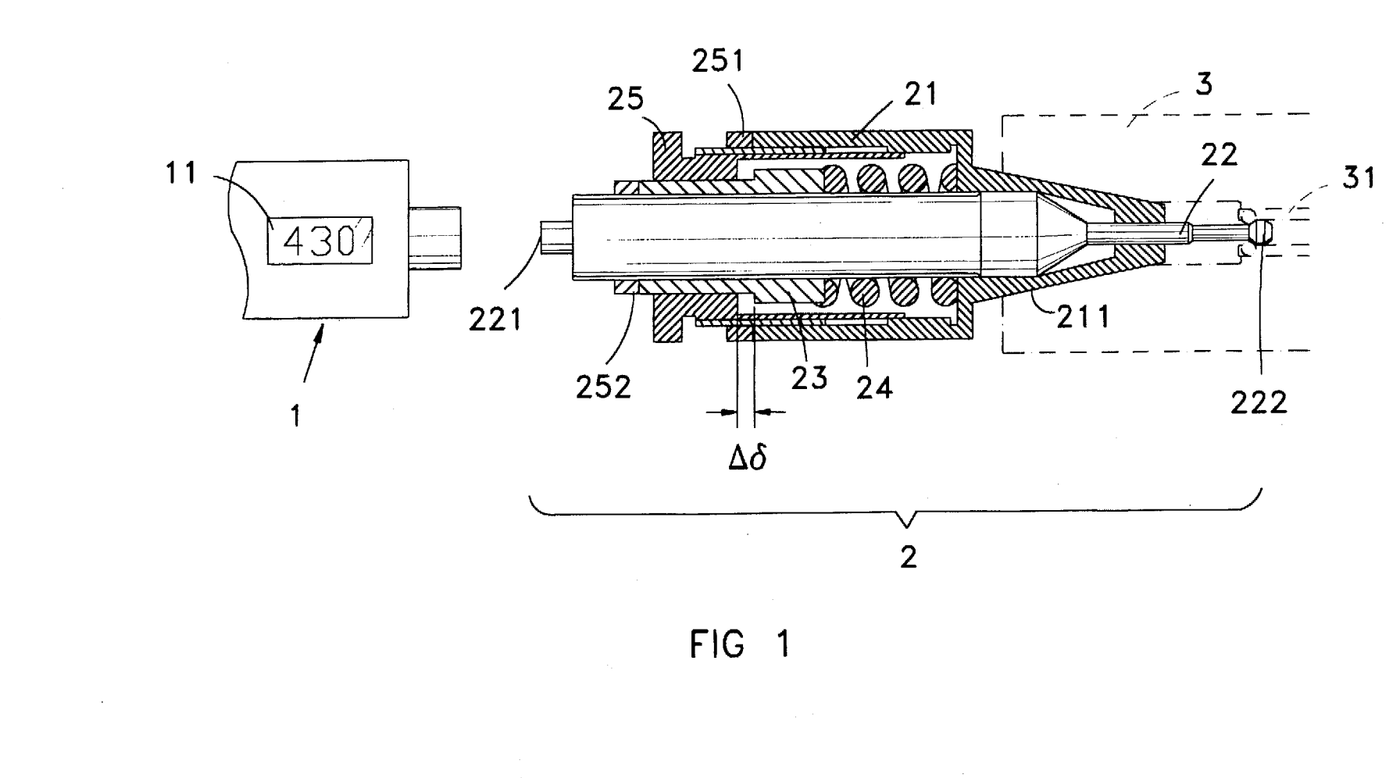
FIG. 1 is a sectional view of a preferred embodiment of the measuring mechanism according to the present invention.

The apparatus using the above-mentioned method is illustrated in FIG. 1. The apparatus comprises a displacement sensor 1 and a measuring sensor 2 having a sliding shaft 22, the displacement sensor 1 being fixedly mounted near a measuring end 221 of the sliding shaft 22 for detecting the displacement of the sliding shaft 22.

The measuring mechanism 2 is fitted to an end portion of a spindle 3 and clamped by a tool draw-in mechanism 31 within the spindle 3. The measuring mechanism 2 includes a hollow body 21, the sliding shaft 22 and an elastic element 24. The body 21 has a first end whose outer rim forms a taper 211 for fitting into a tapered hole in the spindle 3. The sliding shaft 22 is slidably mounted within the body 21 and has the measuring end 221 and a clamped end 222 respectively projecting from the two ends of the body 21. The sliding shaft 22 is provided with a sliding element 23 at its waist portion capable of sliding therewith. In the figure, the elastic element 24 is shown as a helical pressure spring maintained between the sliding element 23 and the interior of the body 21 inside the body 21 for stopping the sliding element 23 from moving towards the first end of the body 21. Therefore, the measured draw-in force must be greater than the tension of the elastic element 24 in order to be able to pull the sliding shaft 22. Once the sliding shaft 22 starts to move, it will continue to displace until the draw-in force is equivalent to the tension of the elastic element 24. If an adjusting element (to be described hereinafter) is used to adjust the relative positions of the sliding element 23 and the body 21, then the tension of the elastic element 24 may be adjusted, enabling the presetting of the minimum force required to pull the sliding shaft 22.

In the preferred embodiment shown in FIG. 1, an adjusting element 25 is screwably locked to the body 21 and positioned firmly by a nut 251. The sliding element 23 is slidably fitted within the adjusting element 25 though it is screwably locked on the sliding shaft 22 and positioned by a lock nut 252. By means of its threads, the sliding element 23 may be used to adjust the distance between the sliding shaft 22 and the draw-in mechanism 31 in the spindle 3, so that the draw-in mechanism 31 may firmly clamp the clamped end 222 of the sliding shaft 22 and the sliding element 23 may follow the sliding shaft 22 to freely slide in the adjusting element 25 within the body 21.

Figure 2:
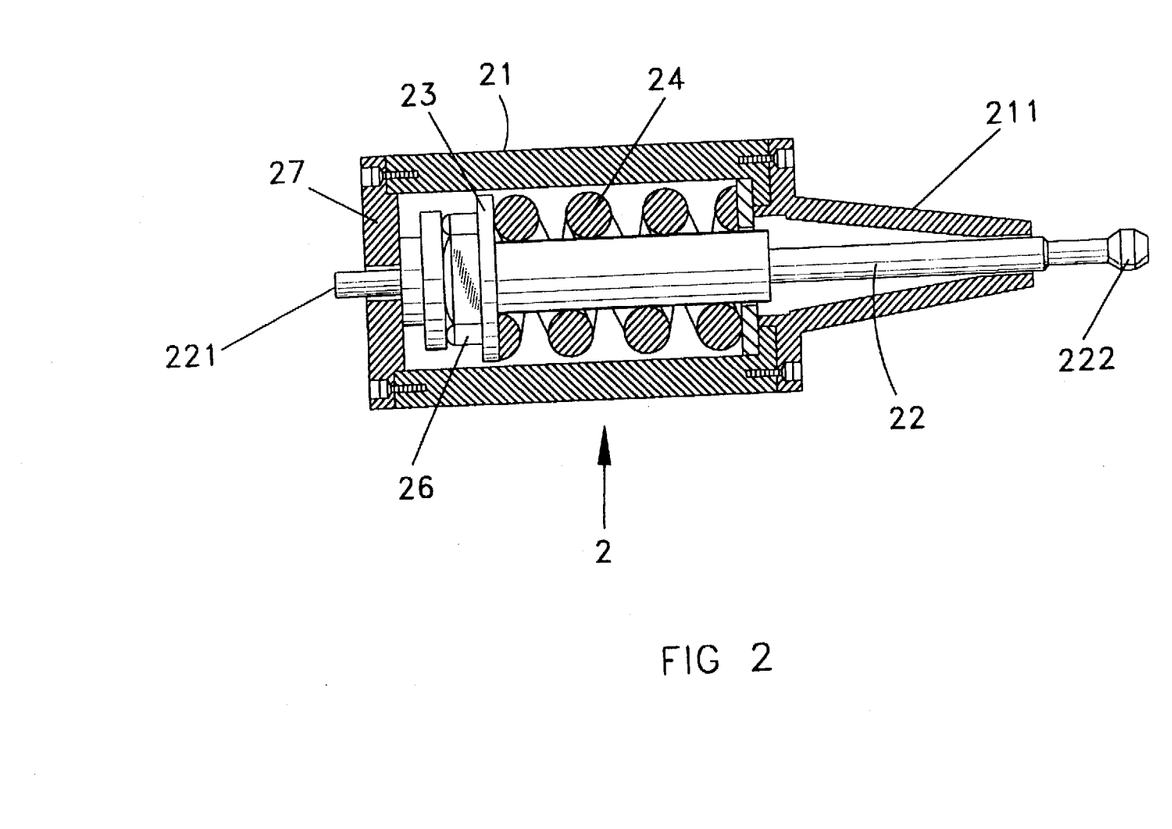
FIG. 2 is similar to FIG. 1, but showing another preferred embodiment.

FIG. 2 shows another preferred embodiment, in which a nut 28 screwably locked on the sliding shaft 22 is used as both an adjusting element and a sliding element. Although it is also an exploitation of the threads of the nut 26 to adjust the relative positions of the nut 26 and the body 21, it requires removal and mounting of a rear cover 27 on the body 21, which is comparatively troublesome.

Figure 3:
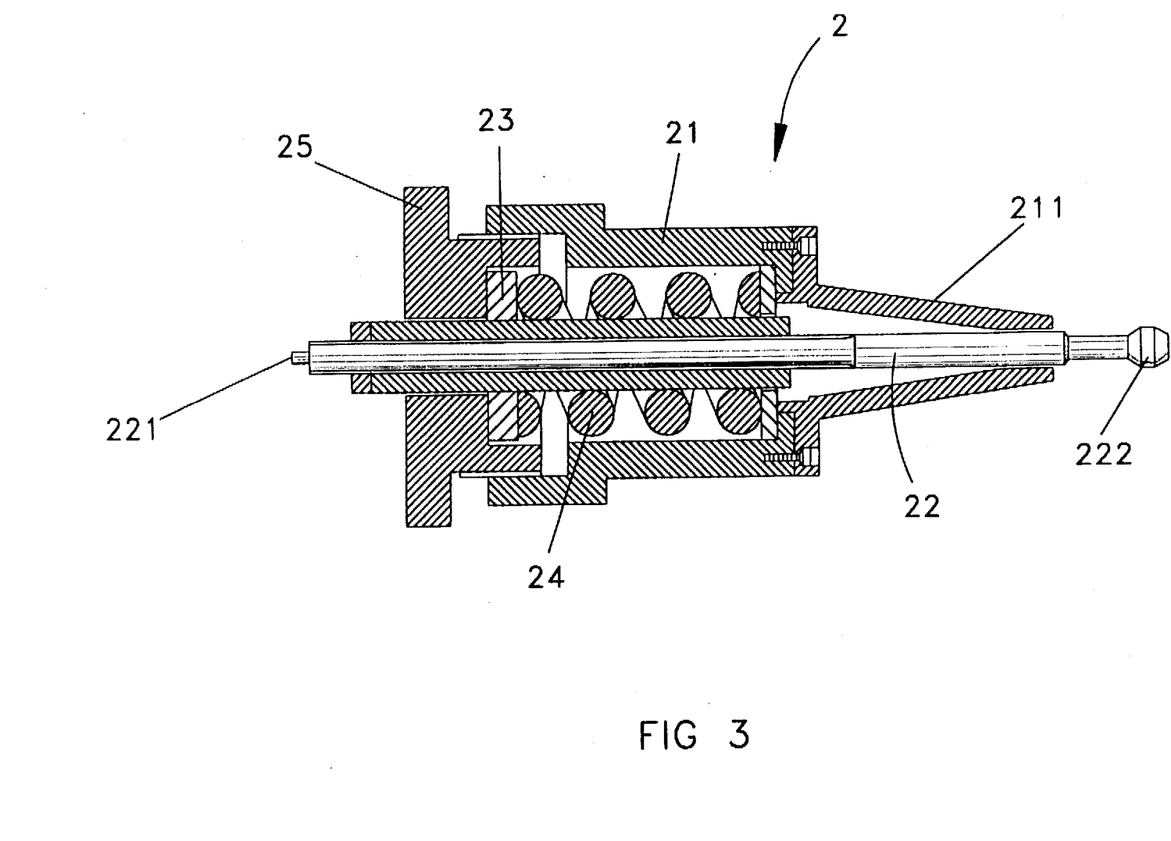
FIG. 3 is also similar to FIG. 1, but showing still another preferred embodiment.

FIG. 3 illustrates still another preferred embodiment, unlike the first preferred embodiment in FIG. 1, the taper 211 is assembled to the body 21. Furthermore, the sliding element 23 is comprised of a slip ring and a threaded tube.

The elastic element 24 is preferably the helical pressure spring shown in the figure. Although a tension spring may be used, it is unable to generate a relatively satisfactory resistance on the sliding element 23. Nevertheless, the measured draw-in force is equivalent to the resistance of the elastic element 24. For pressure springs, resistance is the force the spring resists a pressure exerted thereon. The draw-in force (F) may be represented by the following equation:

$$F = K \cdot \Delta\delta$$

wherein K is a constant corrected according to the elastic element and $\Delta\delta$ the displacement of the sliding shaft 22, the displacement being measured by the displacement sensor 1, as mentioned above. If the displacement sensor 1 is provided with a digital display 11, it will be more convenient to obtain the readings of the measured draw-in force.

Figure 4A:
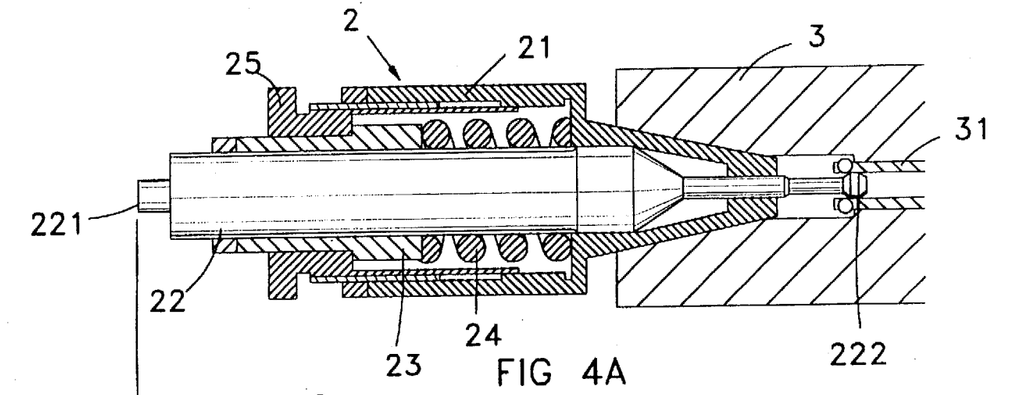
Figure 4B:
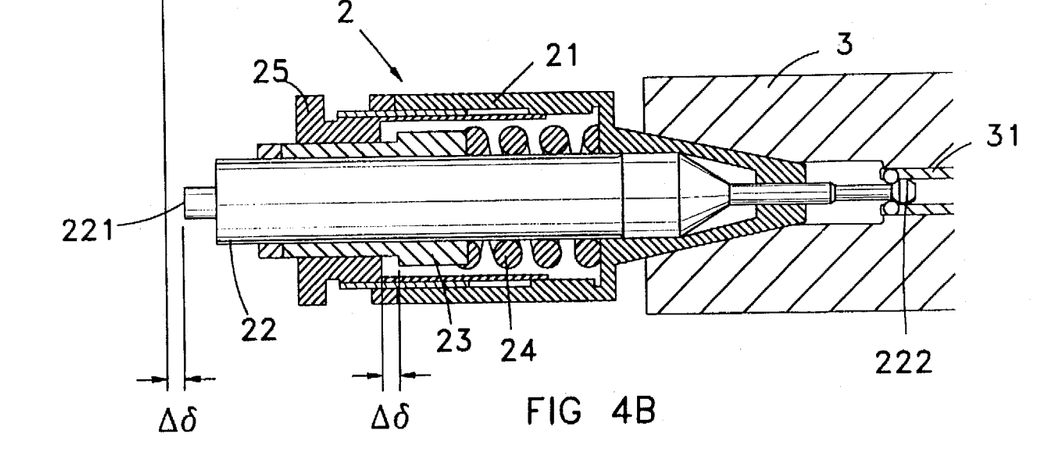

The taper 211 at the first end of the body 21 preferably has an inclination of 7:24 so that it may match a wide variety of machine tools. The states of the measuring mechanism 2 fitted at the rear of the spindle 3 during measuring operations are respectively illustrated in FIGS. 4A and 4B.

Figure 7:
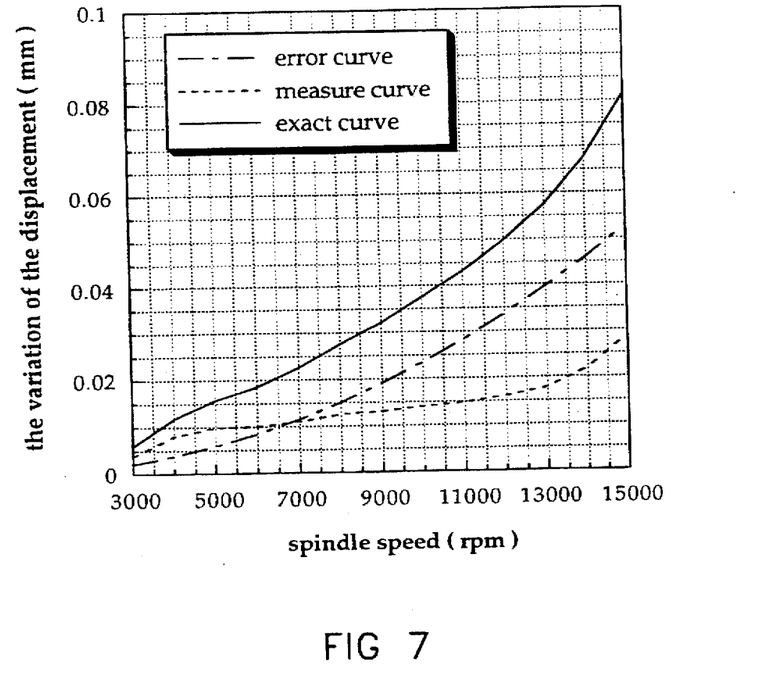
FIG. 7 is a graph showing changes of the rotational speeds of the spindle versus the measured displacements.
Figure 8:
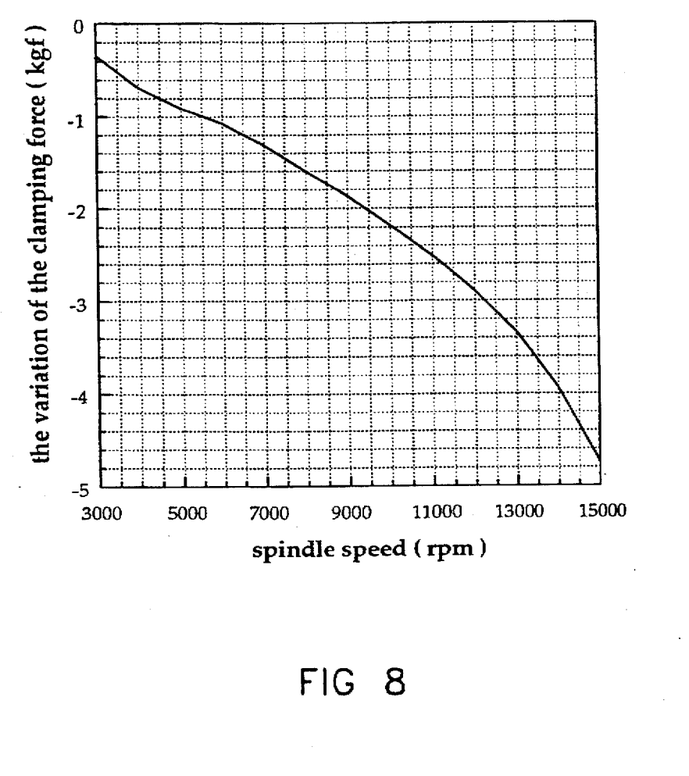
FIG. 8 is a graph showing changes of the rotational speed of the spindle versus changes of the draw-in force.

FIG. 5 shows the error between the theoretical values K1 and experimental values K2 obtained when the helical pressure spring is static. The theoretical values K1 may generally be obtained from suppliers while the experimental values K2 were obtained from actual experiments by the inventors using a material testing machine. K2 is essentially linear with a gradient the same as that of the corrected actual curve K3. From this graph, the draw-in force (F) obtainable by the method according to the present invention may be read from the measured displacement. When the measuring mechanism according to the present invention is used to measure a rotating machine spindle, the measure curve shown in FIG. 7 may be obtained. However, after discovering the latent factors as shown in FIG. 6, the inventors provide an error curve to serve as a basis for correcting the measure curve in order to obtain a more exact curve. FIG. 7 shows the changes in the measured displacement during rotation of the spindle. Correspondingly, there are changes in the draw-in force, hence the results shown in FIG. 8. Both FIGS. 7 and 8 show the experimental results of the present invention, and the latent factors generated during rotation of the spindle have heretofore never been disclosed.

The present invention provides a special method and mechanism to enable the measuring of draw-in force in a more developed and convenient way and a breakthrough that allows measuring systems to be used with rotating spindles.

Although the present invention has been illustrated and described with reference to the preferred embodiments thereof, it should be understood that it is in no way limited to the details of such embodiments, but is capable of numerous modifications within the scope of the appended claims.

What is claimed is:

1. A draw-in force measuring apparatus for measuring the axial draw-in force of a draw-in mechanism within a spindle, said apparatus comprising:

a measuring mechanism fitted to an end of said spindle and clamped by said draw-in mechanism in said spindle, said measuring mechanism comprising a hollow body having a first end whose outer rim forms a taper; a sliding shaft slidably mounted within said body and having a measuring end and a clamped end respectively projecting from the ends of said body, said sliding shaft having a sliding element at its waist portion capable of displacing therewith; and an elastic element disposed within said body and maintained between said sliding element and an interior of said body for stopping said sliding element from moving towards the first end of said body; and a displacement sensor fixedly mounted near said measuring end of said sliding shaft for sensing a displacement value of said sliding shaft.

2. The draw-in force measuring apparatus as claimed in claim 1, wherein said elastic element is a helical pressure spring or multiple overlapping Belleville springs.

3. The draw-in force measuring apparatus as claimed in claim 1, wherein said body accommodates an adjusting element for adjusting the relative positions of said sliding element and said body to suitably press said elastic element for presetting a minimum draw-in force value of the displacement of said sliding shaft.

4. The draw-in force measuring apparatus as claimed in claim 1, wherein said displacement sensor has a digital display.

5. The draw-in force measuring apparatus as claimed in claim 1, wherein said displacement sensor is a non-contact displacement sensor aligning with said measuring end of said sliding shaft and being positioned in place.

6. A method for measuring the draw-in force value of a spindle of a machine tool, said method comprising:

(1) coupling a support to an end of a spindle of a machine tool;

(2) mounting pivotally a sliding element having a projecting portion at a center of said support and causing a tool draw-in mechanism inside said spindle to clamp one end of said sliding element;

(3) selecting and disposing in advance an elastic element between said support and said projecting portion of said sliding element so as to generate a resistance when said sliding element is being pulled;

(4) predetermining a constant value according to the characteristics of said elastic element;

(5) securing a displacement sensor for sensing the displacement of said sliding element; and (6) multiplying the constant value of the selected elastic element by the sensed displacement value to obtain a draw-in force value.

7. The method as claimed in claim 6, further comprising adjusting the resistance of said elastic element to permit presetting of a minimum force required to pull said sliding element.

8. The method as claimed in claim 6, wherein said displacement sensor measures in a non-contact manner by aligning with the other end of said sliding element.

* * * * *